3,343,976
SURFACE PREPARATION FOR FLUORINATED PLASTICS
Virgil R. Matlock, Los Angeles, Calif., assignor to North American Aviation, Inc.
No Drawing. Filed May 7, 1964, Ser. No. 365,813
2 Claims. (Cl. 117—47)

ABSTRACT OF THE DISCLOSURE

A process is described for preparing fluorinated plastic surfaces for bonding, potting, or coating. The process includes the steps of abrading the plastic surface, applying a coating of photopolymerizable material to the surface, and exposing the coating to ultraviolet light. Materials such as paints, adhesives, and potting compounds which normally do not adhere to fluorinated plastic will adhere to such plastics when treated by the inventive process.

---

This invention relates to a process for preparing fluorinated plastic surfaces for bonding, potting or coating, by the use of a photo-polymerizable coating and exposure to ultraviolet light or by use of a bondizing agent which is self-polymerizing.

Bonding to fluorinated plastics is a problem because of the chemical inertness of the material. As a result, organic materials, cements, encapsulating compounds and other fluorinated plastics do not readily adhere to a fluorinated plastic surface. Examples of such fluorinated plastics are Tetrafluoroethylene (Teflon TFE), the copolymer of TFE and hexafluoro propylene (Teflon FEP) and Polychlorotrifluoroethylene (KEL-F, Halon). Some success in effecting adhesion between the surfaces indicated has been realized by chemically etching a fluorinated plastic surface with chemicals such as metallic sodium in naphthalene and tetrahydrofurane solutions. However, etching processes have certain shortcomings, such as the instability of the chemical solutions, the corrosiveness of the solutions in contact with wire or other metals, resultant marginal electrical surface resistivity, moisture penetration of bond lines, and the high cost of the chemicals used.

It is an object of this invention to provide a process for preparing fluorinated plastic surfaces so that bonding, potting or coating compounds will exhibit an improved adherence to the fluorinated surfaces.

Another object of this invention is to provide a process for bonding fluorinated plastics together or to other surfaces such as, but not limited to, metals and organic polymers.

A still further object of this invention is to provide improved adhesion and sealing of fluorine polymer electrical insulation and parts to encapsulating resins, such as in electrical connectors.

A still further object of the invention is to provide a process for encapsulating electrical plug assemblies embodying fluorinated plastic insulation which has not received prior chemical or other treatment to improve the adherence to potting compounds, or other materials.

A still further object of this invention is to provide a process for preparing fluorinated surfaces for bonding without the use of chemical etching.

Other advantages will become apparent in connection with the description of this invention contained herein.

The invention, in one embodiment comprises the steps of abrading and cleaning a fluorinated plastice surface; applying a thin consistent film coating of a photo-polymerizable material to the fluorinated plastic surface and afterwards subjecting the coated surface to heat or air until dry, then exposing the coating to ultraviolet light, for a period of time. After the exposure to ultraviolet light, the surface is ready for painting, potting, bonding and other uses.

A more specific description of the invention, including several examples and variations of the invention, follows. In Step 1 the surface area of a fluorinated plastic such as Teflon is abraded, for example with a sanding cloth, and cleaned afterwards with a fast evaporating solvent, for example, with methyl ethyl ketone.

In Step 2, a film of a photo-polymerizable coating is applied to the surface of fluorinated plastic 1 by means well known in the art such as spraying, brushing, swabbing, etc. The photo-polymerizable coating may be comprised of such materials as the polyvinyl ester of cinnamic acid commercially available as Kodak Photo Resist and also as Kodak Photo Lacquer. The coating is dried by subjecting it to heat at approximately 160° F. for approximately ten minutes. In the alternative, the coating may be dried by subjecting it to air for approximately 20 minutes. The time and temperature for the example given may vary depending on the environment, thickness of the coating, and particular type of coating.

In Step 3, the surface of fluorinated plastic 1, with the photo-polymerizable coating thereon, is exposed to ultraviolet light for times and at intensities as required to properly polymerize a particular coating, for example, within the wavelength range from 3400 to 4000 angstroms for apprixamately four minutes if polyvinyl esters of cinnamic acid is the coating material.

After radiation by ultraviolet light, the surface is ready for bonding to other materials, in Step 4. The general process steps are utilized in the examples below illustrating specific uses of the process in preparing a fluorinated plastic surface for adhesion to other surfaces including fluorinated plastic surfaces.

Example I

In a series of tests, 20 pieces of 3 inch by 6 inch virgin Teflon sheets were abraded with a sanding cloth and cleaned with methyl ethyl ketone. The specimens were then spray coated with a thin, wet, consistent film of polyvinyl cinnamic acid polymer and air dried at room temperature for approximately 30 minutes. Other experiments utilized force drying at approximately 155° F. for approximately 10 minutes. After drying, the coated surfaces were exposed to ultraviolet radiation within the range of 3400 to 4000 angstroms for approximately 4 minutes. The exposed specimens were painted with nitrocellulose lacquers, alkyd enamels, zinc chromate, pretreatment and lacquer primers, and certain other chemically resistant epoxy coatings. In addition, high temperature compounds and adhesives were applied to remaining specimens. The specimens were individually tested by tests well known in the art, and all specimens exhibited good adhesion properties. The same coatings, applied to virgin and to abraded virgin Teflon exhibited no, or very slight adhesion.

Example II

A simulated electrical plug was made as follows:
Step 1.—Several strands of 20 gage Teflon insulated electrical wire were abraded with sanding cloth and cleaned afterwards with methyl ethyl ketone.
Step 2.—A film of photopolymerizable coating (KPR) was applied to the Teflon wire insulation and dried for 10 minutes at 160° F.
Step 3.—The coated wire was exposed to ultraviolet light within the wavelength required to properly polymerize the coating.
Step 4.—After exposure to ultraviolet light, the wire was suspended in a high temperature potting compound together with chemically treated insulated wire and non-treated (chemical or otherwise) insulated wire.

After the potting compound was thoroughly cured, the wire was comparatively tested for adhesion properties. The adhesion of the chemically treated and the treated insulation described in the above example exhibited comparable results and was much higher than for the untreated or control sample wires.

*Example III*

Epoxy adhesive bonded specimens were prepared as follows:

Step 1.—Several 1 x 5 inch strips of Teflon were abraded with sanding cloth and cleaned afterwards with methyl ethyl ketone.

Step 2.—A film of photopolymerizable coating (KPR) was applied to the Teflon strips and dried for 10 minutes at 160° F.

Step 3.—The coated strips of Teflon were exposed to ultraviolet light, within the wavelength required to properly polymerize the coating.

Step 4.—After exposure to ultraviolet light, the Teflon strips were used in the following bonded combinations: Teflon-epoxy laminate, Teflon-Teflon, Teflon-anodized aluminum, and Teflon-painted Teflon.

The bonded specimens were comparatively tested for bond strength. The bond strength of all the specimens were comparable and good.

The use of certain ultraviolet polymerizable resins and the polymerization of these by ultraviolet light while in the form of coatings on scuffed fluorinated plastic surfaces, thereby resulting in adhesion of these resinous coatings to difficult-to-adhere-to-surfaces is unique.

Other materials such as coatings, potting compounds and adhesives, not otherwise adherent to the original fluorinated plastic surface, are found to be adherent to the original fluorinated plastic surface after surface treatment.

An example of an ultraviolet polymerizable resin having this ability has been found to be of the polyvinyl cinnamic acid polymer type. Many other materials, which polymerize under more conventional influences, such as oxidation or heat, do not develop adhesion to the unmodified fluoro-carbon polymer.

Although the invention has been described and illustrated in detail, it is to be understood that the same is by way of illustration and example only, and is not to be taken by way of limitation; the spirit and scope of this invention being limited only by the terms of the appended claims.

I claim:

1. A process for preparing surface areas of fluorinated plastics for adhesion with other materials comprising the steps of coating a fluorinated plastic surface with an unpolymerized photo-polymerizable polyvinyl cinnamic acid polymer; exposing the dried photo-polymerizable coating to ultraviolet light.

2. A process for bonding fluorinated plastic surfaces with other materials comprising the steps of abrading a fluorinated plastic surface; cleaning the abraded surface with a solvent; coating said cleaned surface with a thin, wet, consistent film of a polyvinyl cinnamic acid polymer; drying the coated surface; exposing the dried, coated surface to ultraviolet light for a suitable length of time; and applying an adhesive to the exposed surface.

References Cited

UNITED STATES PATENTS

| | | | |
|---|---|---|---|
| 2,725,372 | 11/1955 | Minsk | 260—91.3 |
| 2,809,130 | 10/1957 | Rappaport | 117—47 |
| 2,914,438 | 11/1959 | Sandt et al. | 156—153 |
| 3,030,290 | 4/1962 | Ryan | 204—169 |
| 3,188,265 | 6/1965 | Charbonneau et al. | 161—188 |
| 3,188,266 | 6/1965 | Charbonneau et al. | 161—188 |

EARL M. BERGERT, *Primary Examiner.*

M. L. KATZ, *Assistant Examiner.*